United States Patent [19]

Ito

[11] Patent Number: 4,896,171

[45] Date of Patent: Jan. 23, 1990

[54] LIQUID EJECTION RECORDING HEAD REMOVABLY MOUNTED ON A STORAGE TANK

[75] Inventor: Susumu Ito, Hiratsuka, Japan

[73] Assignee: Canon Kabushiki Kaisha, Tokyo, Japan

[21] Appl. No.: 319,846

[22] Filed: Mar. 6, 1989

Related U.S. Application Data

[63] Continuation of Ser. No. 57,739, Jun. 3, 1987, abandoned, which is a continuation of Ser. No. 715,414, Mar. 25, 1985, abandoned.

[30] Foreign Application Priority Data

Mar. 31, 1984 [JP] Japan .................................. 59-64109

[51] Int. Cl.⁴ ............................ G01D 15/6; B41J 3/04

[52] U.S. Cl. ................................................ 346/140 R

[58] Field of Search ......................................... 346/140

[56] References Cited

U.S. PATENT DOCUMENTS

| | | | |
|---|---|---|---|
| 4,330,787 | 5/1982 | Sato et al. | 346/140 R |
| 4,392,907 | 7/1983 | Shirato | 346/140 X |
| 4,419,678 | 12/1983 | Kasugayama | 346/140 |
| 4,438,191 | 3/1984 | Cloutier | 346/140 X |
| 4,477,823 | 10/1984 | Matsufuji et al. | 346/140 R |
| 4,490,728 | 12/1984 | Vaught | 346/140 X |
| 4,502,060 | 2/1985 | Rankin | 346/140 |
| 4,536,250 | 8/1985 | Ikeda et al. | 156/651 |
| 4,567,493 | 1/1986 | Ikeda et al. | 346/140 R |
| 4,633,274 | 12/1986 | Matsuda | 346/140 R |

*Primary Examiner*—Joseph W. Hartary

*Attorney, Agent, or Firm*—Fitzpatrick, Cella, Harper & Scinto

[57] ABSTRACT

A liquid ejection recording head has an orifice for discharging a liquid to form flying droplets, a liquid chamber communicating with the orifice, an energy generating member for generating energy for forming the droplets, and thin pipes for supplying the liquid contained in a tank to the liquid chamber, characterized in that the thin pipes are arranged at two sides of the orifice in a direction transverse to the direction of liquid conveyance to the energy generating member provided in the liquid chamber and liquid is supplied utilizing capillary action of the thin pipes.

8 Claims, 2 Drawing Sheets

LIQUID EJECTION RECORDING HEAD REMOVABLY MOUNTED ON A STORAGE TANK

This application is a continuation of application Ser. No. 057,739 filed June 3, 1987, now abandoned, which in turn is a continuation of application Ser. No. 715,414, filed Mar. 25, 1985, now abandoned.

BACKGROUND OF THE INVENTION

1. Field of the Invention

The present invention relates to a liquid ejection recording head which is suitably adapted in a recording section of various terminal devices such as a facsimile system or a printer and, more particularly, to a liquid ejection recording head which can be easily connected to or disconnected from various terminal devices.

2. Description of the Prior Art

Liquid ejection recording is currently receiving much attention since this recording method generates only little noise and is capable of recording on normal paper. Among various liquid ejection recording methods, the liquid ejection recording method described in Japanese Patent Application Laid open No. 51837/1979 is distinguished from other methods in that thermal energy is applied to a liquid to eject liquid droplets. More specifically, in this recording method, the liquid subjected to the action of heat energy causes a state change which may result in a sharp increase in volume and by the action force based on this state change. Then, the liquid is discharged from an orifice at the end of a recording head. The flying droplets are formed and these liquid droplets adhere to the recording medium for example, normal papers and thus, and as the result, recording is accomplished.

Conventionally in such a recording apparatus as shown in FIG. 1, a recording liquid is stored in a storage tank 12 arranged at a predetermined location in a terminal device. The recording liquid is fed from the storage tank 12 to a head 13 through a supply pipe 14. When there is no more liquid in the storage tank 12, the tank 12 itself is replaced with a new tank or the tank 12 is replenished with fresh liquid.

A nozzle having an discharge orifice for discharging a recording medium liquid generally has an inner diameter as small as about several tens of microns When dust is introduced into the recording medium liquid or precipitate formed in the liquid after storage of the liquid for a certain period of time remains in the nozzle, the flow rate of the liquid passing through the nozzle is decreased. Then, the discharge efficiency of the recording medium liquid or signal response is degraded. The nozzle may be clogged to disable further discharge of the liquid. This situation may arise frequently due to introduction of dust from the air or in surrounding portions of the liquid when the tank is replenished with fresh liquid every time the supply of the liquid is short.

When discharge of the recording medium liquid from the discharge orifice is stopped for a long period of time, the recording medium liquid becomes dried. Then, components of the recording medium liquid and modified substances thereof become attached to portions surrounding the discharge orifice. When recording is resumed in this case, the discharge direction may not be stable and liquid discharge may not be possible. In this case, the head must be replaced with a new recording head. However, the same problems as earlier experienced may again be encountered when replacing the tank.

In addition, when the tank or recording head is replaced, air may be introduced into the tank, the recording head or the flow path of the recording medium liquid. When air is introduced, discharge efficiency, stability of formation of liquid droplets, response or flowability of the liquid through the flow path is impaired.

SUMMARY OF THE INVENTION

The present invention has been made in consideration of this and has as its object to provide a liquid ejection recording head which can be easily connected to or disconnected from a tank.

It is another object of the present invention to provide a liquid ejection recording head in which the number of parts in systems for supplying a liquid and recovering liquid discharge capacity is reduced to allow a simple structure.

It is still another object of the present invention to provide a liquid ejection recording head in which ink replenishment can be performed with high reliability when a tank or head is replaced.

It is still another object of the present invention to provide a liquid ejection recording head having an orifice for ejecting a liquid to form flying droplets, a liquid chamber communicating with the orifice, an energy generating member for generating energy for forming the droplets, and a thin pipe for supplying the liquid contained in a tank to the liquid chamber, wherein the thin pipes are arranged at two sides of the orifice for ejecting the liquid in a direction to cross the supplying direction of the liquid supplied to the energy generating member in the liquid chamber, and the liquid is supplied utilizing capillary action of the thin pipes.

DETAILED DESCRIPTION OF THE PREFERRED EMBODIMENT

The present invention will be described in detail with reference to the accompanying drawings.

A liquid ejection recording apparatus of a preferred embodiment according to the present invention will be described with reference to the sectional view shown in FIG. 2 and the exploded perspective view shown in FIG. 3.

Figure 1:
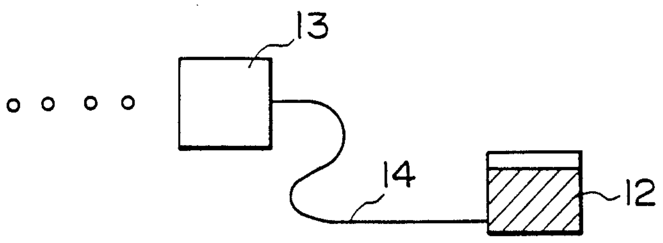
F I G. 1 PRIOR ART
FIG. 1 is a schematic view showing a conventional liquid ejection recording apparatus and a recording liquid tank thereof.
Figure 2:
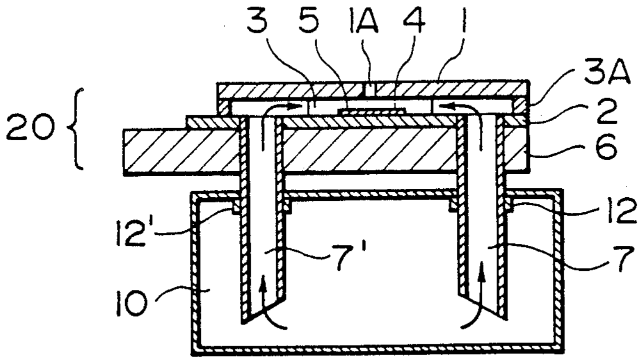
FIG. 2 a sectional view showing a liquid ejection recording apparatus and a recording liquid tank thereof according to an embodiment of the present invention.
Figure 3:
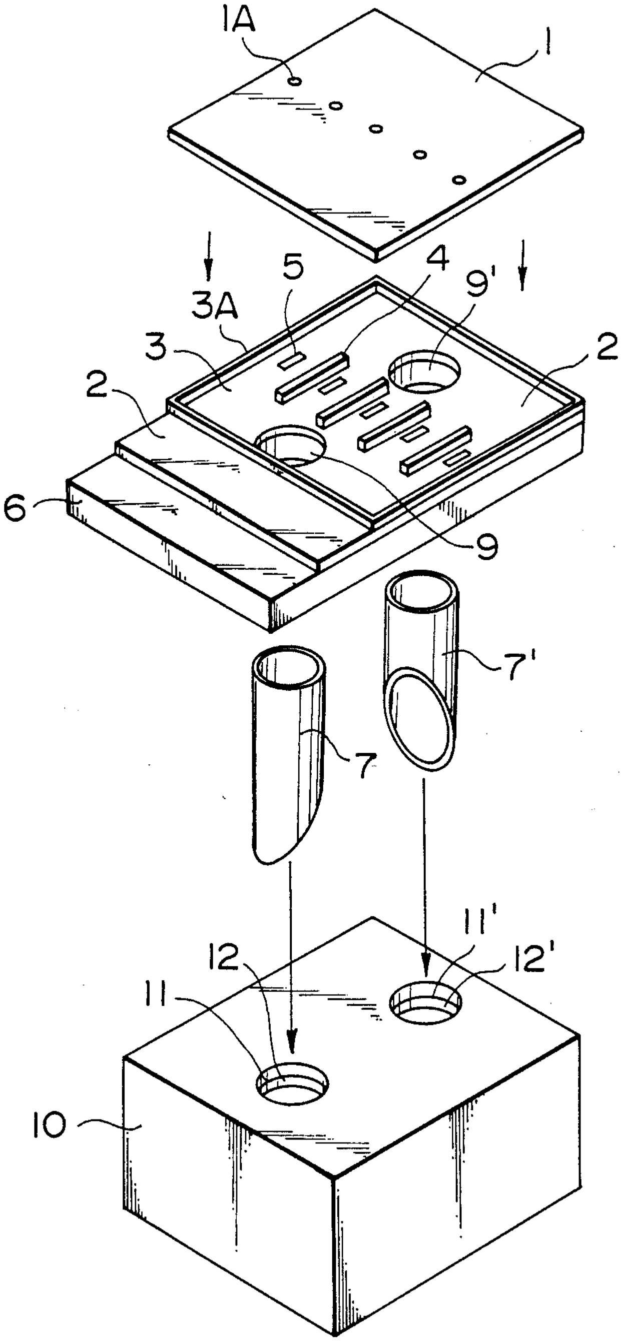
FIG. 3 is an exploded perspective view of the parts of the apparatus and tank shown in FIG. 2.

Referring to FIGS. 2 and 3, an orifice plate 1 has an discharge orifice 1A. The orifice plate 1 is fixed on a support or base member 2 through a liquid chamber wall 3A to define a liquid chamber 3. A plurality of flow walls 4 are arranged inside the liquid chamber 3 and on the base member 2. An discharge energy generator, for example, a heat-generating resistor 5 comprising an electrical-thermal converter is arranged as an energy generator for supplying energy to a supplied liquid to form flying droplets. The support member 2 on one portion of which the ejection energy generator (heat-generating resistor) 5 is mounted, has an insulating surface. The discharge energy generator 5 is connected to an electrical circuit through an electrode (not shown).

The support member 2 is placed on a head support plate 6. Recording liquid supply ports 9 and 9' are formed in the support member 2 and the head support plate 6, respectively, to communicate them. Communication pipes 7 and 7' having pointed ends are connected to the supply ports and 9' project away from an opposing portion of the base member 2, that is in the direction opposite to the liquid chamber 3. The communication pipes 7 and 7'' extend into the liquid chamber 3 through holes 11 and 11' formed in a recording liquid tank 10 to supply the liquid in the tank 10 to the liquid chamber 3 therethrough. The communication pipes may comprise, for example, stainless pipes.

In order to tightly insert the communication pipes 7 and 7' into the holes 11 and 11', rubber sealing rings 12 and 12' are preferably mounted in the holes 11 and 11', respectively.

A recording head 20 comprises member 1, 2, 3A, 4, 5, 6, 7' and can be connected to or disconnected from the tank 10. Rubber stoppers (not shown) can be mounted in the holes 11 and 11' of the tank 10. When the recording head 20 is not mounted on the tank 10, the tank is sealed by mounting these rubber stoppers in the holes 11 and 11'. Then, leakage of the liquid when the recording head 20 is not mounted on the tank can be prevented.

When the recording head 20 is mounted on the tank 10, the rubber stoppers are removed and the communication pipes 7 and 7' are inserted in the holes 11 and 11'. The recording liquid in the tank 10 is guided upward by capillary action through the pipes 7 and 7' and is filled in the liquid chamber 3.

During recording, droplets are discharged from the orifice 1A in response to a drive pulse supplied to the discharge energy generator through wiring (not shown).

In this embodiment, since the communication pipes 7 and 7' are arranged at the two sides of the liquid chamber 3 with the orifice 1A interposed therebetween, air bubbles will not be formed in the liquids chamber when the recording liquid is replenished. Even if air bubbles are formed in the liquid chamber 3, since the supply systems of the recording liquid are at the both sides of the liquid chamber, recovery of ejection capacity can be easily performed by liquid suction through the orifice 1A. Therefore, replacement of the recording head and the tank can be performed by any unskilled person.

The head support plate 6 can be a printed circuit board. A connector and electrode pattern for connection with the electrodes (not shown) on the base member 2 can be formed on this printed circuit board. Electrical connection with a terminal recording device can be performed through a slot formed at the side of the terminal device and the connector on the head support plate 6.

The supply/suction tube included in a conventional recording liquid supply system can be omirted. In addition, the recording head can be easily connected to or disconnected from the head support plate 6 with the connector.

As can be seen from the above description, according to the present invention, the recording head can be easily connected to or disconnected from the tank, air bubbles will not be formed in the liquid chamber, and replenishment of the recording liquid can be performed with high reliability. In addition, since the supply/suction tube for ejection capacity recovery can be omitted, the number of parts can be reduced, the manufacturing process can be shortened, and an inexpensive recording head can be provided.

According to the present invention, even if the thickness of the liquid chamber is as thin as several tens of micrometers, the recording liquid can be supplied from the two sides of the liquid path defined by the flow path walls. Therefore, replenishment of the recording liquid is facilitated, and degradation in the frequency characteristics of ejection can be prevented.

The present invention thus provides a liquid ejection recording head which is inexpensive and allows reliable liquid replenishment by an unskilled user, easy replacement of faulty parts, easy recovery of ejection capacity, and easy maintenance.

In the above embodiment, the flow path walls 4 are formed in the liquid chamber 3 to form a flow path corresponding to each orifice 1A. However, if crosstalk between the adjacent ejection orifices falls within a predetermined range, the flow path walls 4 can be omitted.

When the recording liquid is supplied from the tank 10, recording liquid supply communication pipes can be inserted into stoppers or the like of elastic members (rubber members or the like) arranged in the tank 10 so as to supply the recording liquid. In this case, the sealing rings 12 and 12' can be omitted to provide a simpler construction.

What I claimed is:

1. A liquid ejection recording head removably mountable on a storage tank for storing liquid therein, the head comprising:

means defining an orifice for discharging the liquid therethrough;

a liquid chamber communicating with said orifice;

an energy generating member for generating energy for forming droplets of the liquid;

a base plate having a first portion on which said liquid chamber and said energy generating member are provided; and needle-type liquid supply pipes for insertion into the storage tank, said liquid supply pipes being arranged at opposite sides of said energy generating member such that said energy generating member is disposed generally between said liquid supply pipes and thus can be fed liquid from opposite sides thereby, wherein said liquid supply pipes project away from another portion of said base plate opposite said liquid chamber to supply the liquid from the storage tank to said liquid chamber and said energy generating member, and wherein said recording head discharges droplets in a direction transverse to that of liquid conveyance to said energy generating member from said liquid supply pipes.

2. A liquid ejection recording apparatus comprising:

means defining an orifice for discharging the liquid therethrough;

a liquid chamber communicating with said orifice;

an energy generating member for generating energy for forming droplets of the liquid;

a base plate having a first portion on which said liquid chamber and said energy generating member are provided;

a storage tank for storing liquid therein; and needle-type liquid supply pipes removably inserted into said storage tank, said liquid supply pipes being arranged at opposite sides of said energy generating member such that said energy generating member is disposed generally between said liquid supply pipes and thus can be fed liquid from opposite sides thereby, wherein said liquid supply pipes project away from another portion of said base plate opposite said liquid chamber to supply the liquid from said storage tank to said liquid chamber to supply the liquid from said storage tank to said liquid chamber and said energy generating member, and wherein said recording head discharges droplets in a direction transverse to that of liquid conveyance to said energy generating member from said liquid supply pipes.

3. A device according to claim 1 or 2, wherein flow path walls for forming a flow path corresponding to said orifice are arranged in said liquid chamber.

4. A device according to claim 1 or 2, wherein said energy generating member comprises an electrical-thermal converter.

5. A device according to claim 1 or 2, wherein said liquid supply pipes communicate with the storage tank through holes therein.

6. A device according to claim 5, wherein said holes have sealing rings mounted therein.

7. A device according to claim 1 or 2, wherein said energy generating member generates thermal energy.

8. A device according to claim 1 or 2, wherein said energy generating member generates thermal energy.

* * * * *

UNITED STATES PATENT AND TRADEMARK OFFICE
CERTIFICATE OF CORRECTION

PATENT NO. : 4,896,171

DATED : January 23, 1990

INVENTOR(S) : SUSUMU ITO

It is certified that error appears in the above-identified patent and that said Letters Patent is hereby corrected as shown below:

COLUMN 1

Line 44, "an" should read --a--.
Line 46, "microns" should read --microns.--.

COLUMN 2

Line 58, "an" (second occurrence) should read --a--.
Line 63, "An" should read --A--.

COLUMN 3

Line 8, "are" should be deleted.
Line 9, "supply ports and 9'" should read --supply ports 9 and 9'--.
Line 10, "that is" should read --that is,--.
Line 12, "pipes 7 and 7"" should read --pipes 7 and 7'--.
Line 42, "liquids chamber" should read --liquid chamber--.
Line 59, "omirted." should read --omitted.--.

COLUMN 4

Line 30, "claimed" should read --claim--.

COLUMN 5

Line 10, "to supply the liquid from said storage tank" should be deleted.
Line 11, "to said liquid chamber" should be deleted.

UNITED STATES PATENT AND TRADEMARK OFFICE
CERTIFICATE OF CORRECTION

PATENT NO. : 4,896,171

DATED : January 23, 1990

INVENTOR(S) : SUSUMU ITO

It is certified that error appears in the above-identified patent and that said Letters Patent is hereby corrected as shown below:

COLUMN 6

Line 12, "said" should be deleted.
Line 13, "energy generating member generates thermal energy." should read --the liquid is supplied to said energy generating member by utilizing the capillary action of said liquid supply pipes.--.

Signed and Sealed this

Twenty-seventh Day of August, 1991

*Attest:*

HARRY F. MANBECK, JR.

*Attesting Officer*

*Commissioner of Patents and Trademarks*